(12) United States Patent
Depraete

(10) Patent No.: US 9,822,862 B2
(45) Date of Patent: Nov. 21, 2017

(54) HYDROKINETIC TORQUE COUPLING DEVICE FOR A MOTOR VEHICLE

(71) Applicant: VALEO EMBRAYAGES, Amiens (FR)

(72) Inventor: Alexandre Depraete, Bloomfield, MI (US)

(73) Assignee: Valeo Embrayages (FR)

( * ) Notice: Subject to any disclaimer, the term of this patent is extended or adjusted under 35 U.S.C. 154(b) by 17 days.

(21) Appl. No.: 14/873,303

(22) Filed: Oct. 2, 2015

(65) Prior Publication Data

US 2017/0097075 A1   Apr. 6, 2017

(51) Int. Cl.
F16H 45/02   (2006.01)

(52) U.S. Cl.
CPC ..... *F16H 45/02* (2013.01); *F16H 2045/0221* (2013.01)

(58) Field of Classification Search
CPC ........................ F16H 45/02; F16H 2045/0221
See application file for complete search history.

(56) References Cited

U.S. PATENT DOCUMENTS

| | | | |
|---|---|---|---|
| 2,551,718 A | 5/1951 | Auten | |
| 4,145,936 A | 3/1979 | Vincent et al. | |
| 5,477,950 A | 12/1995 | Maloof | |
| 5,485,757 A * | 1/1996 | Foxwell | G01L 3/1435 73/862.321 |
| 5,697,261 A | 12/1997 | Mokdad et al. | |
| 5,893,355 A | 4/1999 | Glover et al. | |
| 6,224,487 B1 | 5/2001 | Yuergens | |
| 2001/0032767 A1 | 10/2001 | Reinhart | |
| 2003/0106763 A1 | 6/2003 | Kimura et al. | |
| 2015/0107950 A1 | 4/2015 | Mauti | |
| 2015/0260270 A1 | 9/2015 | Kwon | |
| 2015/0369296 A1 | 12/2015 | Lopez-Perez | |
| 2015/0377320 A1 | 12/2015 | Miyahara | |

FOREIGN PATENT DOCUMENTS

| | | |
|---|---|---|
| DE | 19729421 A1 | 1/1998 |
| DE | 19919449 A1 | 11/1999 |
| DE | 102004024747 A1 | 12/2005 |
| EP | 1048420 A2 | 11/2000 |
| FR | 2339107 A1 | 8/1977 |
| FR | 2493446 A1 | 5/1982 |
| FR | 2499182 A1 | 8/1982 |
| FR | 2628804 A1 | 9/1989 |
| FR | 2714435 A1 | 6/1995 |
| FR | 2828543 A1 | 2/2003 |

(Continued)

*Primary Examiner* — Jacob S Scott
(74) *Attorney, Agent, or Firm* — Berenato & White, LLC

(57) ABSTRACT

The invention relates to a hydrokinetic torque coupling device for a motor vehicle, comprising a torque input element (11) intended to be coupled to a crankshaft (1), an impeller wheel (3) rotationally coupled to the torque input element (11) and able to hydrokinetically drive a turbine wheel (4), a torque output element (8) intended to be coupled to a transmission input shaft (2), clutch means (10) able to rotationally couple the torque input element (11) and the torque output element (8) in an engaged position, through damping means (21, 25) and able to rotationally uncouple the torque input element (11) and the torque output element (8) in a disengaged position.

17 Claims, 7 Drawing Sheets

(56) References Cited

FOREIGN PATENT DOCUMENTS

| | | |
|---|---|---|
| FR | 2938030 A1 | 5/2010 |
| FR | 3000155 A1 | 6/2014 |
| GB | 1212042 A | 11/1970 |
| GB | 2235749 A | 3/1991 |
| GB | 2262795 A | 6/1993 |
| GB | 2283558 A | 5/1995 |
| GB | 2284875 A | 6/1995 |
| GB | 2468030 A | 8/2010 |
| JP | 09280317 A | 10/1997 |
| WO | WO9914114 A1 | 3/1999 |
| WO | WO9941525 A1 | 8/1999 |
| WO | WO2004016968 A1 | 2/2004 |
| WO | WO2011006264 A1 | 1/2011 |
| WO | WO2014128380 A1 | 8/2014 |

* cited by examiner

HYDROKINETIC TORQUE COUPLING DEVICE FOR A MOTOR VEHICLE

FIELD OF THE INVENTION

The present invention relates to a hydrokinetic torque coupling device for a motor vehicle, such as a torque converter, for instance.

BACKGROUND OF THE INVENTION

A known hydrodynamic torque converter is schematically and partially illustrated in FIG. 1 and makes it possible to transmit a torque from the output shaft of an internal combustion engine in a motor vehicle, such as for instance a crankshaft 1, to a transmission input shaft 2.

The torque converter conventionally comprises an impeller wheel 3, able to hydrokinetically drive a turbine wheel 4 through a reactor 5.

The impeller wheel 3 is coupled to the crankshaft 1 and the turbine wheel 4 is coupled to guiding washers 6.

A first group of elastic members 7a, 7b of the compression spring type is mounted between the guiding washers 6 and a central hub 8 coupled to the transmission input shaft 2. The elastic members 7a, 7b of the first group are arranged in series through a phasing member 9, so that said elastic members 7a, 7b are deformed in phase with each other, with said phasing member 9 being movable relative to the guiding washers 6 and relative to the hub 8.

A second group of elastic members 7c is mounted with some clearance between the guiding washers 6 and the central hub 8 in parallel with the first group of elastic members 7a, 7b, with said elastic members 7c being adapted to be active on a limited angular range, more particularly at the end of the angular travel of the guiding washers 6 relative to the central hub 8. The angular travel, or an angular shift α, of the guiding washers 6 relative to the hub 8, is defined relative to a rest position (α=0) wherein no torque is transmitted through damping means formed by the above-mentioned elastic members 7a, 7b.

The torque converter further comprises clutch means 10 adapted to transmit a torque from the crankshaft 1 to the guiding washers 6 in a determined operation phase, without any action from the impeller wheel 3 and the turbine wheel 4.

The second group of elastic members 7c makes it possible to increase the stiffness of the damping means at the end of the angular travel, i.e. for a significant α angular offset of the guiding washers 6 relative to the hub 8 (or vice versa).

It can be seen that the representation of function M=f(α) which defines the M torque transmitted through the device according to the α angular shift, comprises a first linear portion of slope Ka (for the low values of the α angular shift) and a second, more important, linear portion of slope Kb (for the high value of the α angular shift). Ka and Kb are the angular stiffness of the device, at the beginning and at the end of the angular travel respectively. If K1 defines the cumulated stiffness of the first springs of each pair of the first group, and K2 defines the cumulated stiffness of the second springs of each pair of the first group, and K3 defines the cumulated stiffness of the springs of the second group, then Ka=(K1·K2)/(K1+K2) and Kb=Ka+K3.

The break of slope between the first and second portions of the curve may generate vibrations and a significant hysteresis upon operation of the torque converter which might affect the quality of filtration obtained using the damping means.

SUMMARY OF THE INVENTION

The invention more particularly aims at providing a simple, efficient and cost-effective solution to this problem.

For this purpose, it provides for a hydrokinetic torque coupling device for a motor vehicle, comprising
  a torque input element intended to be coupled to a crankshaft,
  an impeller wheel rotationally coupled to the torque input element
  a turbine wheel, with the impeller wheel being adapted to hydrokinetically drive the turbine wheel,
  a torque output element intended to be coupled to a transmission input shaft,
  damping means,
  clutch means adapted to rotationally couple the torque input element and the torque output element in an engaged position, through damping means, and able to rotationally uncouple the torque input element and the torque output element in a disengaged position, with the damping means being adapted to act against the rotation of the torque input element relative to the torque output element, in the engaged position of the clutch means, with the damping means comprising at least one elastic blade which rotates together with the torque output element or the clutch means respectively, and a supporting member carried by the clutch means or the torque output element respectively, with the blade being elastically maintained supported by said supporting member, with said elastic blade being adapted to bend upon rotation of the torque input element relative to the torque output element, in an engaged position, with the hydrokinetic torque coupling device further comprising at least one radially internal flange rotating together with the torque output element and at least one radially external flange so mounted as to pivot about said internal flange and guided to rotate about said internal flange, with the elastic blade rotating together with the internal flange, respectively the external flange, with the supporting member being connected to the external flange, respectively the internal flange.

Such damping means give a characteristic gradual curve, without any break of slope. The invention thus makes it possible to reduce the vibrations generated in operation and provides a high quality of filtration.

Besides, such a hydrokinetic torque coupling device is easy to mount and rather inexpensive It should be noted that the words "radial" and "axial" are defined with respect to the hydrokinetic torque coupling device, which is the axis of rotation of the impeller wheel or of the turbine wheel.

It should be noted that a hydrokinetic torque coupling device may be a torque converter when the hydrokinetic torque coupling means comprise an impeller wheel, a turbine wheel and a reactor, or may be a hydrokinetic coupling device when the hydrokinetic torque coupling means have no reactor.

The impeller wheel is adapted to hydrokinetically drive the turbine wheel, through a reactor, for instance.

The hydrokinetic torque coupling device may comprise two radially internal flanges rotating together with the torque output element and two radially external flanges so mounted as to pivot about said internal flanges and guided to rotate about said internal flanges, with the elastic blade being mounted in a space axially arranged between the internal flanges and/or between the external flanges, with the supporting member being mounted in a space axially arranged between the external flanges, respectively the internal flanges.

The presence of two internal flanges and two external flanges makes it possible to facilitate the guiding of the external flanges about the internal flanges, to better take over the radial stresses in operation, or still to be able to fasten the elastic blade and the supporting member on each one of the opposite flanges so as to avoid any cantilevered mounting.

Besides, the internal flange and the external flange may comprise concentric cylindrical guiding rims adapted to rest on each other so as to form a bearing.

As an alternative embodiment, the external flange may be so mounted as to pivot about the internal flange through a rolling bearing, such as a ball bearing, for instance.

Each internal flange may be totally positioned inside, relative to the external flange, with each external flange being totally positioned inside, relative to the internal flange. In other words, the internal and external flanges then have no total overlapping zone.

Besides, the turbine wheel may be rotationally coupled to the torque output element and to the internal flange.

Besides, the clutch means may comprise at least one piston rotationally coupled to the external flange, with the piston being able to move between an engaged position wherein it is rotationally coupled to the torque input element and a disengaged position wherein it is rotationally uncoupled from the torque input element.

The piston is then able to move axially, independently of the other elements of the hydrokinetic torque coupling device.

In this case, the external flange may be rotationally coupled to the piston through at least one protruding part connected to the external flange, respectively to the piston, cooperating, in a form-fitting manner, with at least one recessed part connected to the piston, respectively to the external flange, with the protruding and the recessed parts enabling an axial motion of the piston relative to the external flange while ensuring the rotational coupling of the piston and the external flange.

As an alternative embodiment, the external flange may be connected to the piston through at least one member elastically deformable in the axial direction, so as to enable an axial motion of the piston relative to the external flange while providing a rotational coupling of the piston and of the external flange.

The radially internal periphery of the external flange may comprise at least one lug, with the member elastically deformable in the axial direction being fastened to said lug.

Besides, the torque output element may comprise a central hub. The turbine wheel and/or the damping means may be directly connected thereto.

Besides, the hydrokinetic torque coupling device may comprise a reactor, with the impeller wheel being adapted to hydrokinetically drive the turbine wheel through the reactor. The hydrokinetic torque coupling device thus forms a hydrodynamic torque converter.

The hydrokinetic torque coupling device may also comprise one or more of the following characteristics:
- the supporting member comprises at least one rolling body, such as a roller so mounted as to pivot about an axis, for instance through a rolling bearing, such as a needle bearing, for instance.
- the supporting member is mounted on the radially external periphery of the external flange,
- the impeller wheel is rotationally coupled to a cover wherein the impeller wheel, the turbine wheel and/or the damping means are at least partially accommodated.
- the torque input element comprises said cover,
- the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a circumferential component which tends to move back the torque input element and the torque output element toward said relative rest position.
- the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a circumferential component which tends to move back the torque input element and the torque output element toward said relative rest position.
- in the engaged position, the angular displacement of the torque input element relative to the torque output element is greater than 20° and preferably greater than 40°.
- the elastic blade comprises a fastening portion and an elastic portion comprising a radially internal strand, a radially external strand and a bowed or bent portion connecting the internal and the external strand.
- the damping means comprise at least two elastic leaves, with each elastic blade rotating together with the torque output element, or the torque input element in engaged position respectively, with each blade being associated with a supporting element rotationally linked with the torque input element in engaged position, or the torque output element respectively, with each blade being elastically maintained supported by said matching supporting element, with each elastic blade being adapted to bend upon rotation of the torque input element relative to the torque output element in engaged position.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

Figure 1:
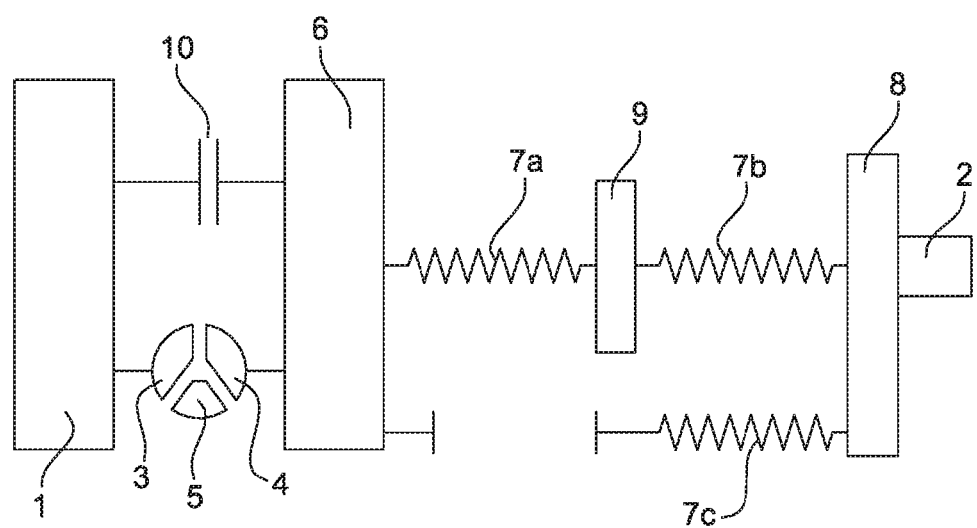
FIG. 1 is a schematic representation of a torque converter of the prior art.
Figure 2:
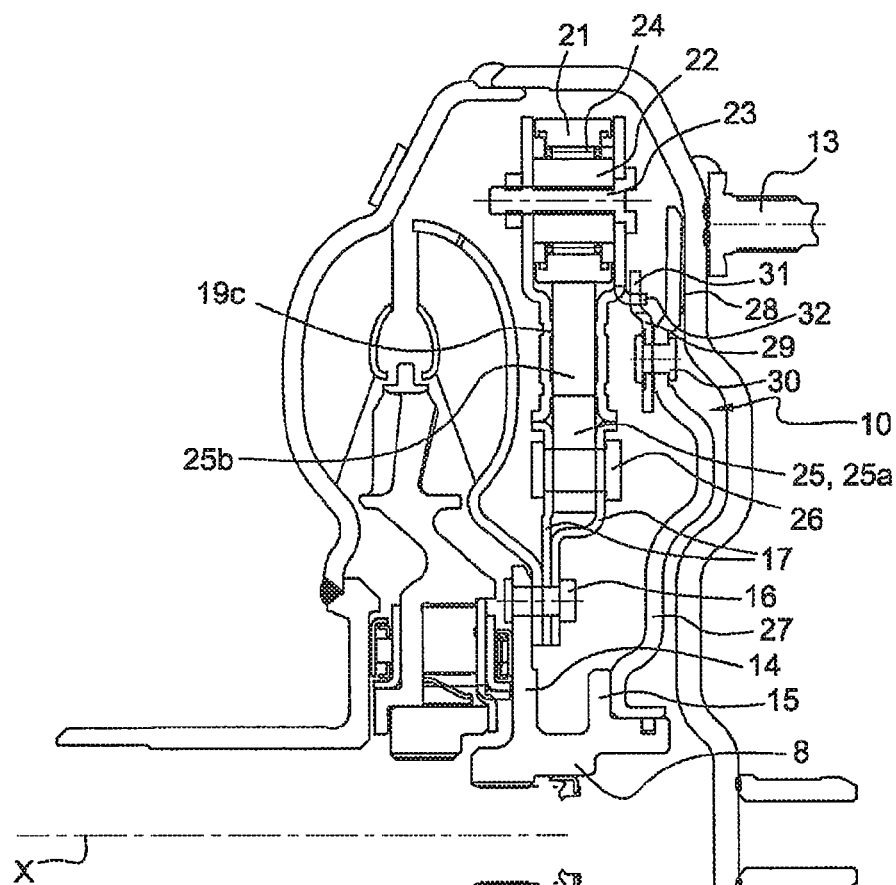
FIG. 2 is a sectional view along an axial plane, of a torque converter according to a first embodiment of the invention.
Figure 2:
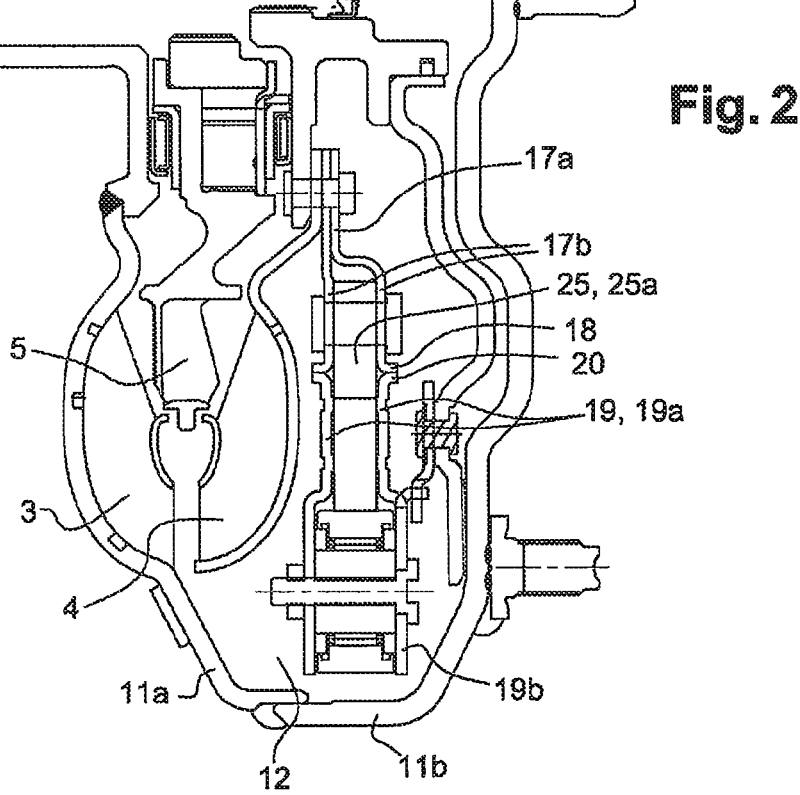

A hydrokinetic torque coupling device according to a first embodiment of the invention is shown in FIG. 2.

The hydrokinetic torque coupling device is more particularly a hydrodynamic torque converter.

Such device makes it possible to transmit a torque from the output shaft of an internal combustion engine in a motor vehicle, such as for instance a crankshaft 1, to a transmission input shaft 2. The axis of the torque converter bears reference X.

In the following, the words "axial" and "radial" are defined relative to the X axis.

The torque converter conventionally comprises an impeller wheel 3, able to hydrokinetically drive a turbine bladed wheel 4 through a reactor 5.

The impeller wheel 3 is fastened to a cover consisting of two bell-shaped parts 11a, 11b assembled together by welding and defining an internal volume 12 accommodating the impeller wheel 3, the turbine wheel 4 and the reactor 5. Said cover 11a, 11B, also more generally referred to as cover 11, comprises fastening means 13 making it possible to rotationally couple said cover 11 with the crankshaft 1.

The torque converter further comprises a central hub 8, the radially internal periphery of which is ribbed, with an X axis and accommodated in the internal volume 12 of the cover 11. The central hub 8 comprises a first annular rim 14 which extends radially outwards and a second annular rim 15 which extends radially inwards and positioned ahead of the first rim 14.

The turbine wheel 4 is fastened to the first annular rim 14 of the central hub 8, for instance by rivets 16 or by welding.

Two radially internal annular flanges 17 are mounted in said internal volume 12, with the two flanges 17 being fastened by their radially internal periphery to the rim 14 of the hub 8 by rivets 16, as mentioned above, or by welding, for instance.

The flanges 17 radially extend and comprise each a radially internal portion 17a and a radially external portion 17b. The radially internal portions 17a of both flanges 17 are axially closer to each other than the radially external portions 17b of both flanges 17.

The internal flanges 17 further comprise cylindrical rims 18 on their radially external periphery, with each rim 18 extending axially opposite the facing internal flange 17.

Two radially external annular flanges 19 are further mounted in the internal volume 12 of the cover 11 around the internal flanges 17. Each external flange 19 radially extends and comprises a radially internal portion 19a and a radially external portion 19b. The radially internal portions 19a of both external flanges 19 are axially closer to each other than the radially external portions 19b of both external flanges 19.

The external flanges 19 are fastened together as will be described in greater details hereunder.

The external flanges 19 comprise cylindrical rims 20 on their radially external periphery, with each rim 20 extending axially opposite the facing external flange 19. The rims 18 of the internal flanges 17, on the one hand, and the rims 20 of the external flanges 19 on the other hand are concentric and adapted to rest on each other so as to form a bearing. The external flanges 19 can thus pivot and be guided relative to the internal flanges 17, through said bearing.

Two supporting members or rolling bodies 21 shaped as rollers or cylindrical rollers, are fixed on the radially external periphery of the external flanges 19. The rolling bodies 21 are positioned so as to be diametrically opposed. The rolling bodies 21 are more specifically mounted about shafts 22 which axially extend between the two external flanges, with said shafts being mounted on the external flanges 19 using bolts 23 or rivets, for instance. The rolling bodies 21 are mounted on the shafts 22 through rolling bearings 24, such as needle bearings, for instance.

The shafts 22 form spacers which make it possible to preserve the spacing between the external flanges 19, with the latter being fastened together at least by bolts 23 or matching rivets.

Two elastic leaves 25 are mounted between the internal and the external flanges. More particularly and as can be best seen in FIG. 4, each elastic blade 25 comprises a fastening portion 25a mounted between the radially external parts 17b of both internal flanges 17 and fastened to the latter by rivets 26, here three in number for each blade 25, and an elastic portion comprising a radially internal strand 25b, a radially external strand 25c, and a bowed or bent portion 25d connecting the internal strand 25b and the external strand 25c. The bowed or bent portion 25d has an angle of approximately 180°. In other words, the elastically deformable portion of the elastic blade 25 comprises two regions radially shifted relative to each other and separated by a radial space.

The external strand 25c develops on the circumference with an angle ranging from 120° to 180°. The radially external strand 25c comprises a radially external surface 25e which forms a raceway supported by the corresponding rolling body 21, with said rolling body 21 being positioned radially outside the external strand 25c of the elastic blade 25. The raceway 25e has a globally convex shape. The raceway 25e may directly consist of a zone of the external strand 25c or of a part which is added onto said external strand 25c.

The external strands 25c of the elastic leaves 25 are able to be axially supported by opposite radial surfaces 19c of the external flanges 19.

Between each elastic blade 25 and the matching rolling body 21, the transmitted torque is broken down into radial stresses and peripheral stresses. Radial stresses make it possible for the matching blade 25 to bend and peripheral stresses make it possible for the matching rolling body 21 to move on the raceway 25e of the blade 25 and to transmit the torque.

The torque converter further comprises clutch means 10 adapted to rotationally couple the cover 11 and the external flanges 19 in the engaged position, and adapted to release the cover 11 of the external flanges 19 in a disengaged position.

The clutch means 10 comprise an annular piston 27 which extends radially and is accommodated in the inner space 12 of the cover 11, the radially external periphery of which comprises a resting area equipped with clutch lining 28 and adapted to rest on the part 11b of the cover 11 in an engaged position, so as to provide a rotational coupling of the cover 11 and the piston 27.

A linking member 29 is fastened to the piston, for instance by rivets, in a zone positioned radially inside the clutch lining 28. The linking member 29 and the cover 11 may of course consist of one single part, without the operation of the torque converter being affected.

Figure 3:
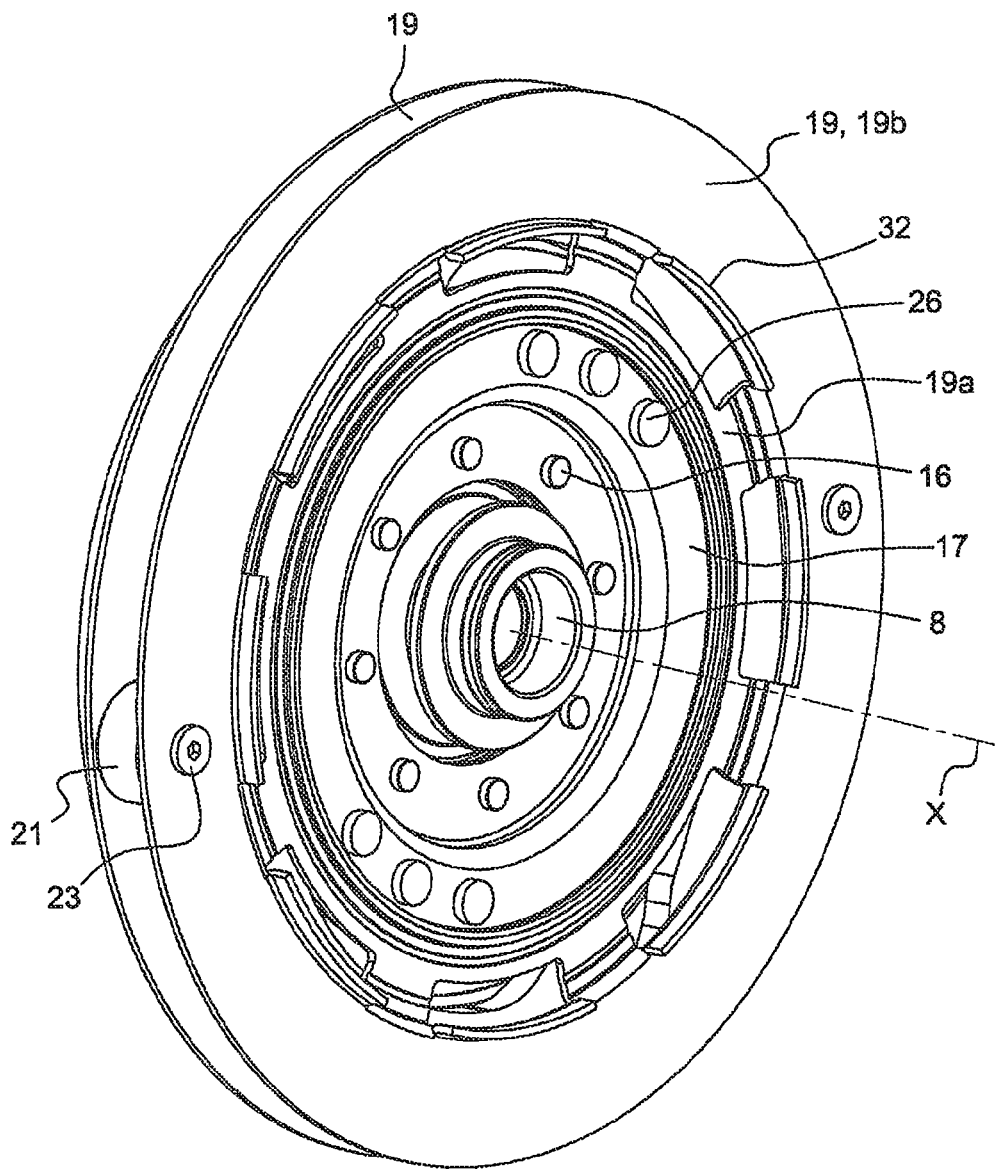
FIG. 3 is a perspective view of a part of the torque converter of FIG. 2.

The linking member 29 comprises at least recessed zones 31 wherein protruding parts 32 are engaged which have matching shapes formed in one of the external flanges 19. The protruding parts are more specifically lugs 32 formed by cutting and folding the matching external flange 19 for instance, which extend axially and circumferentially, as is best seen in FIG. 3.

The piston 27 is thus rotationally coupled to the external flanges 19 while enabling the axial motion of the piston 27 relative to said external flanges 19 between the engaged and disengaged positions thereof. The motion of the piston is controlled by pressure chambers positioned on either side of the piston. Besides, the motion of the piston in the disengaged position may be limited by the radially internal periphery of the piston resting on the second annular rim 15 of the central hub 8.

Such clutch means 10 make it possible to transmit a torque from the crankshaft 1 to the transmission input shaft 2, in a determined operation phase, without any action by the hydrokinetic coupling means consisting of the impeller wheel 3, the turbine wheel 4 and the reactor 5.

In operation, the torque from the crankshaft 1 is transmitted to the cover 11 through the fastening means 13. In the disengaged position of the piston 27, the torque goes through the hydrokinetic coupling means, i.e. the impeller wheel 3 and then the turbine wheel 4 fixed to the flange 8. The torque is then transmitted to the transmission input shaft 2 coupled to the hub through the internal ribs of the hub 8.

In the engaged position of the piston 27, the torque from the cover 11 is transmitted to the external flanges 19, then to the internal flanges 17 through the damping means formed by the elastic leaves 25 and by the supporting members 21. The torque is then transmitted to the internal hub 8 whereon the internal flanges 17 are fastened, then to the transmission input shaft 2 coupled to the hub 8 through the internal ribs of said hub 8.

In the engaged position of the piston 27, when the torque transmitted between the cover 11 and the hub 8 varies, the radial stresses exerted between each elastic blade 25 and the matching rolling body 21 vary and the bending of the elastic blade 25 is modified. The modification in the bending of the blade 25 comes with a motion of the rolling body 21 along the matching raceway 25e due to peripheral stresses.

The raceways 25e have profiles so arranged that, when the transmitted torque increases, the rolling bodies 21 each exert a bending stress on the matching elastic blade 25 which causes the free distal end of the elastic blade 25 to move towards the X axis and a relative rotation between the cover 11 and the hub 8 such that the later move away from their relative rest position. Rest position means the relative position of the flange 11 relative to the hub 8, wherein no torque is transmitted between the latter.

The profiles of the raceways 25e are thus such that the rolling bodies 21 exert bending stresses having radial components and circumferential components onto the elastic leaves 25.

The elastic leaves 25 exert, onto the rolling bodies 21, a backmoving force having a circumferential component which tends to rotate the rolling bodies 21 in a reverse direction of rotation and thus to move back the turbine wheel 4 and the hub 8 towards their relative rest position, and a radial component directed outwards which tends to maintain the raceway 25e supported by the matching rolling body 21.

When the flange 11 and the hub 8 are in their rest position, the elastic leaves 25 are preferably radially pre-stressed toward the X axis so as to exert a reaction force directed radially outwards, so as to maintain the leaves 25 supported by the rolling bodies 21.

The profiles of the raceways 25e may equally be so arranged that the characteristic transmission curve of the torque according to the angular displacement is symmetrical or not relative to the rest position. According to an advantageous embodiment, the angular displacement may be more important in a so-called direct direction of rotation than in an opposite, so-called reverse direction of rotation.

The angular displacement of the cover 11 relative to the hub 8 may be greater than 20°, preferably greater than 40°.

The elastic leaves 25 are regularly distributed around the X axis and are symmetrical relative to the X axis so as to ensure the balance of the torque converter.

The torque converter may also comprise friction means so arranged as to exert a resisting torque between the flange 11 and the hub 8 during the relative displacement thereof so as to dissipate the energy stored in the elastic leaves 25.

Figure 4:
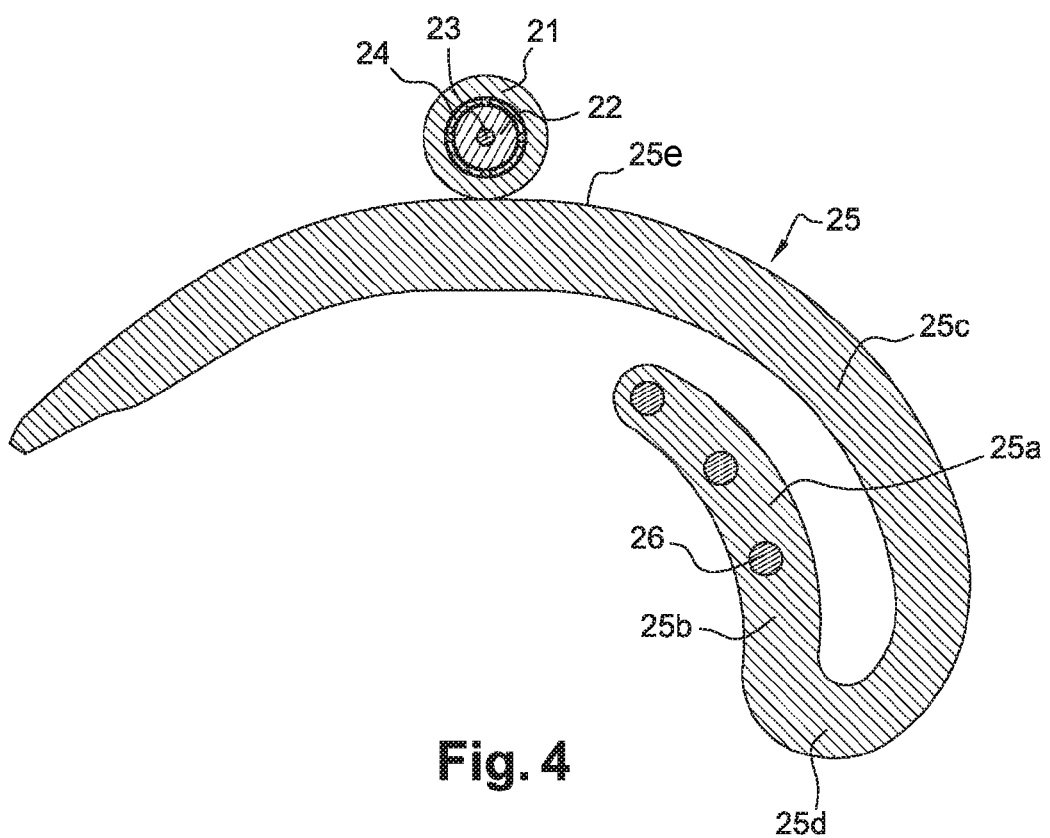
FIG. 4 is a sectional front view illustrating a supporting member and an elastic blade of a torque converter according to the invention.
Figure 5:
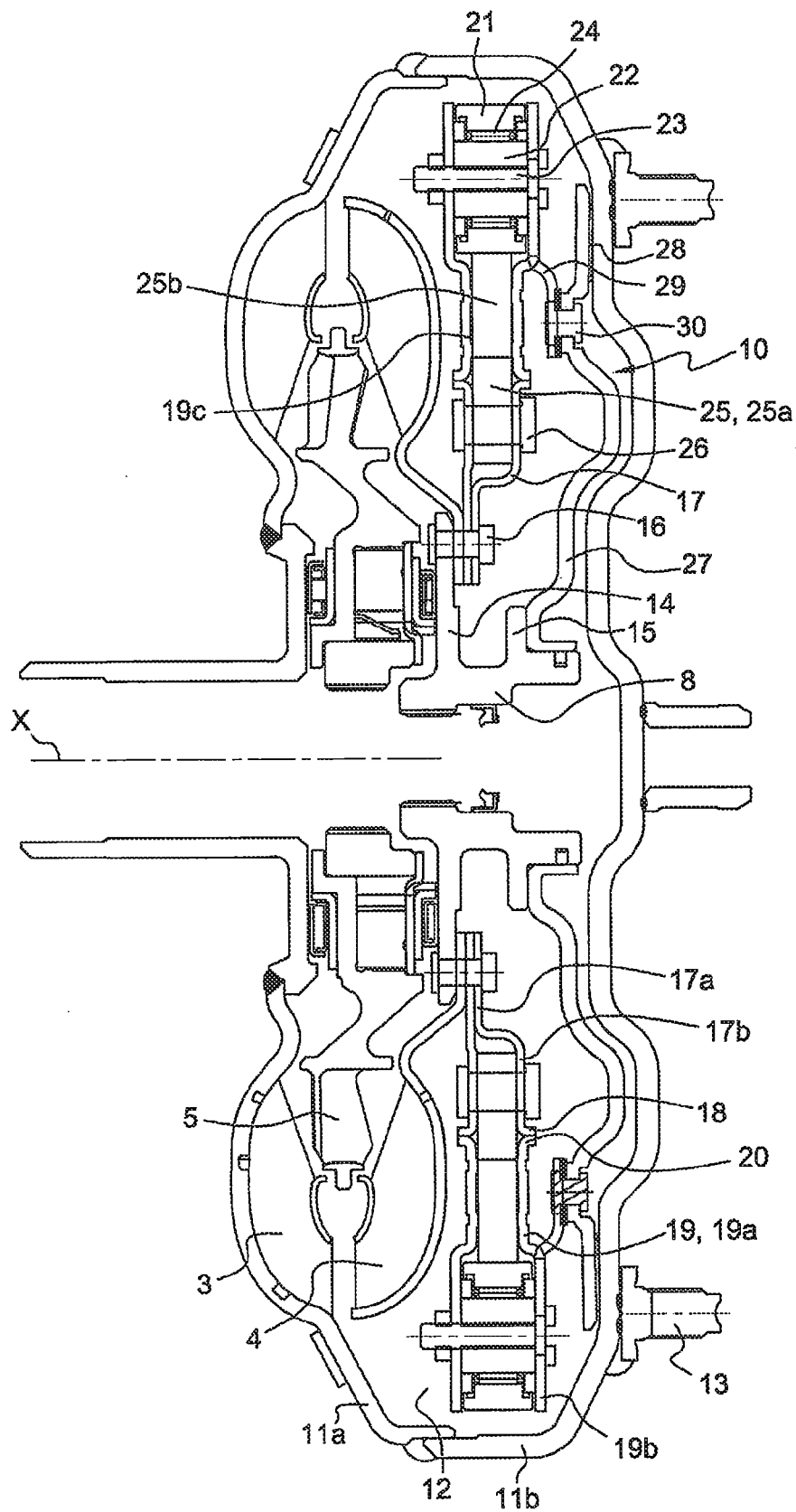
FIG. 5 is a sectional view along an axial plane, of a torque converter according to a second embodiment of the invention.
Figure 6:
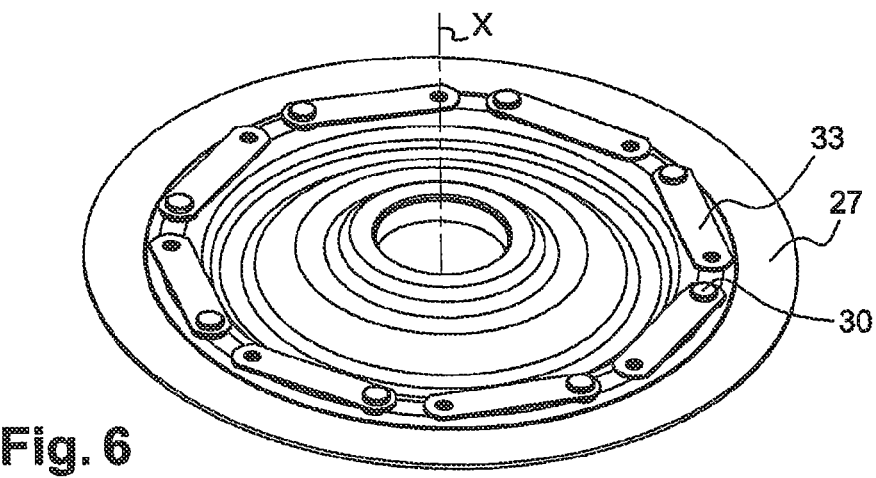
FIG. 6 is a perspective view of the piston of the torque converter of FIG. 5, provided with elastic lugs.
Figure 7:
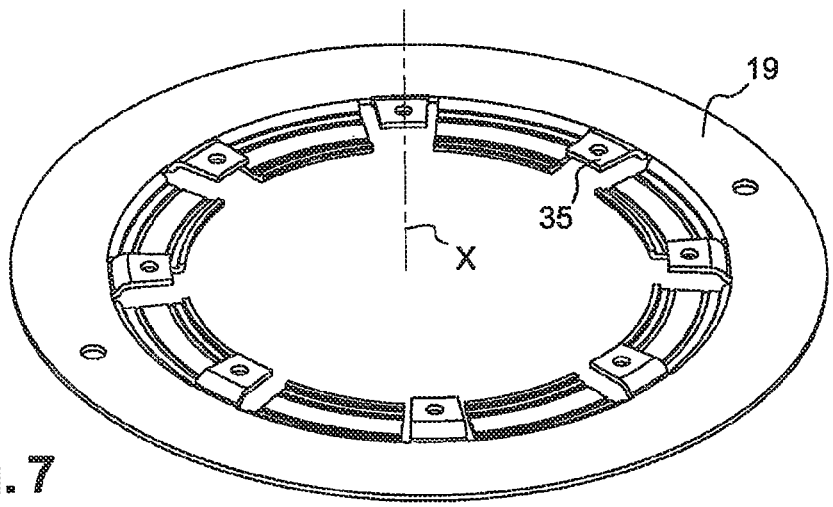
FIG. 7 is a perspective view of one of the external flanges of the torque converter of FIG. 5.
Figure 8:
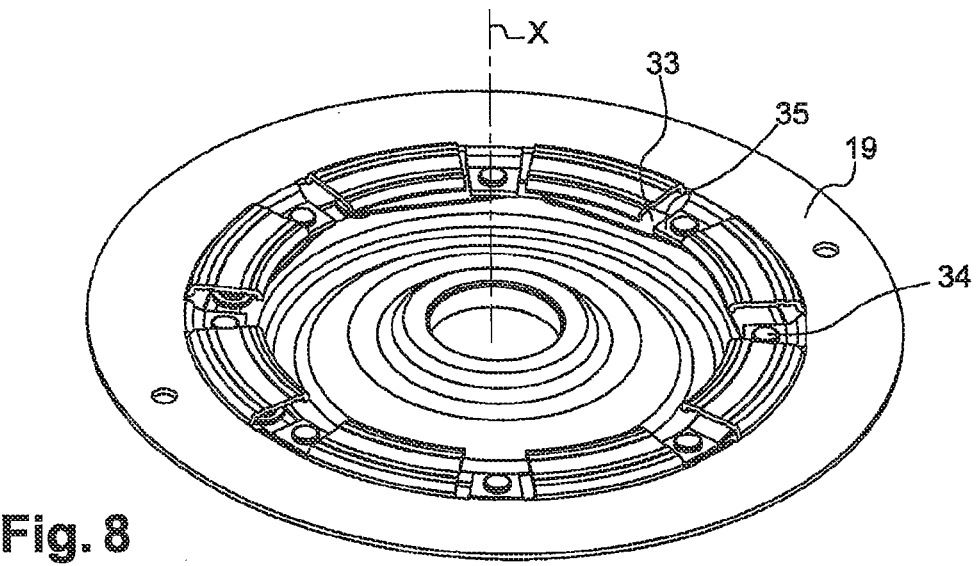
FIG. 8 is a perspective view illustrating the connection between the above mentioned piston, provided with elastic lugs, and flange.

FIGS. 5 to 8 show a second embodiment of the invention, which is different from the one shown in FIGS. 2 to 4 in that the piston 27 is connected to one of the external flanges 19, more particularly the external flange 19 positioned close to the piston 27, through lugs 33 elastically deformable in the radial direction, so as to enable an axial motion of the piston 27 relative to the external flange 19 while providing a rotational coupling of the piston 27 and of the external flange 19. Said lugs 33 may be provided as a single piece with the external flange 19 or be formed by lugs independent of said flange 19 and fastened thereto, by rivets 34 or by welding, for instance.

The matching flange 19 may more specifically comprise lugs 35 on the radially internal periphery of said flange 19, with said lugs being formed by cutting and folding, for instance, so as to axially extend toward the piston 27.

The elastic lugs 33 are fastened to the piston 27 by rivets 30 positioned radially inside, relative to the clutch lining 28 of the piston 27. The lugs 33 are substantially rectilinear, when seen from the front, and are distributed over the whole periphery of the matching flange 19 and the piston 27. Only one lug 33 may be provided to couple the matching flange 19 and the piston 27.

Figure 9:
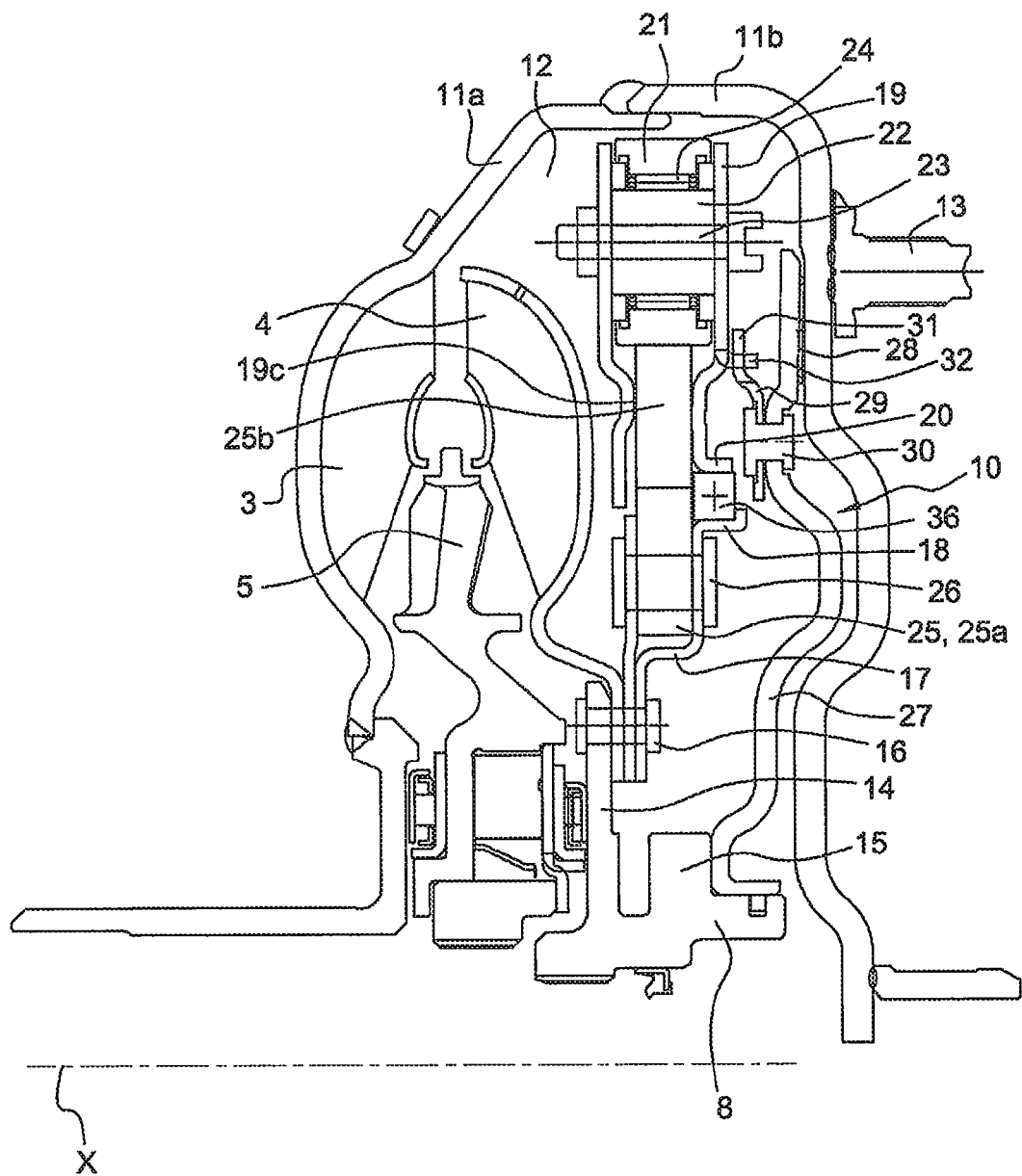
FIG. 9 is a half-view along an axial plane, of a torque converter according to a third embodiment of the invention.

FIG. 9 shows a third embodiment of the invention, which is different from the one shown in FIG. 2 in that only one external flange 19 and one internal flange 17 are provided with cylindrical rims, with a rolling bearing, such as a ball bearing 36, being mounted between the cylindrical rims 18, 20. The external flanges 19 are thus so mounted as to pivot about the internal flanges 17, through the bearing 36.

A bearing may of course be provided between each internal flange 17 and each matching external flange 19. In this case, each flange 17, 19 may comprise a cylindrical rim 18, 20 used for mounting the bearing 36. One or more bearing(s) 36 can also be mounted without any rim 18, 20, for instance when the flanges 17, 19 are thick.

The invention claimed is:

1. A hydrokinetic torque coupling device for a motor vehicle, comprising
   a torque input element (11) intended to be coupled to a crankshaft (1),
   an impeller wheel (3) rotationally coupled to the torque input element (11),
   a turbine wheel (4), with the impeller wheel being adapted to hydrokinetically drive the turbine wheel (4), a torque output element (8) intended to be coupled to a transmission input shaft (2), damping means (21, 25), clutch means (10) adapted to rotationally couple the torque input element (11) and the torque output element (8) in an engaged position, through damping means (21, 25), and able to rotationally uncouple the torque input element (11) and the torque output element (8) in a disengaged position, with the damping means (21, 25) being adapted to act against the rotation of the torque input element (11) relative to the torque output element (8), in the engaged position of the clutch means (10); and, the damping means (21, 25) comprising at least one elastic blade (25) which rotates together with the torque output element (8), and a supporting member (21) carried by the clutch means (10), with the blade (25) being elastically maintained and supported by said supporting member (21), with said elastic blade (25) being adapted to bend upon rotation of the torque input element (11) relative to the torque output element (8), in an engaged position, with the torque converter further comprising at least one radially internal flange (17) rotating together with the torque output element (8) and at least one radially external flange (19) so mounted as to pivot about said internal flange (17) and guided to rotate about said internal flange (17), with the elastic blade (25) rotating together with the internal flange (17), respectively the external flange (19), with the supporting member (21) being connected to the external flange (19).

2. A hydrokinetic torque coupling device according to claim 1, wherein it comprises two radially internal flanges (17) rotating together with the torque output element (8) and two radially external flanges (19) so mounted as to pivot about said internal flanges (17) and guided to rotate about said internal flanges (17), with the elastic blade (25) being mounted in a space axially arranged between the internal flanges (17) and between the external flanges (19), with the supporting member (21) being mounted in a space axially arranged between the external flanges (19).

3. A hydrokinetic torque coupling device according to claim 1 wherein the internal flange (17) and the external flange (19) comprise concentric cylindrical guiding rims (18, 20) adapted to rest on each other so as to form a bearing.

4. A hydrokinetic torque coupling device according to claim 1 wherein the external flange (19) is so mounted as to pivot about the internal flange (17) through a rolling bearing.

5. A hydrokinetic torque coupling device according to claim 1, wherein each internal flange (17) is totally positioned inside, relative to the external flange (19), with each external flange (19) being totally positioned inside, relative to the internal flange (17).

6. A hydrokinetic torque coupling device according to claim 1, wherein the turbine wheel (4) is rotationally coupled to the torque output element (8) and to the internal flange (17).

7. A hydrokinetic torque coupling device according to claim 1, wherein the clutch means (10) comprise at least one piston (27) rotationally coupled to the external flange (19), with the piston (27) being able to move between an engaged position wherein it is rotationally coupled to the torque input element (11) and a disengaged position wherein it is rotationally uncoupled from the torque input element (11).

8. A hydrokinetic torque coupling device according to claim 7, wherein the external flange (19) is connected to the piston (27) through at least one protruding part (32) connected to the external flange (19), respectively to the piston (27), cooperating, in a form-fitting manner, with at least one recessed part (32) connected to the piston (27), respectively to the external flange (19), with the protruding and the recessed parts (31, 32) enabling an axial motion of the piston (27) relative to the external flange (19) while ensuring the rotational coupling of the piston (27) and the external flange (19).

9. A hydrokinetic torque coupling device according to claim 7, wherein the external flange (19) is connected to the piston (27) through at least one member (33) elastically deformable in the axial direction, so as to enable an axial motion of the piston (27) relative to the external flange (19) while providing a rotational coupling of the piston (27) and of the external flange (19).

10. A hydrokinetic torque coupling device according to claim 9, wherein the radially internal periphery of the external flange (19) comprises at least one lug (35), with the member (33) elastically deformable in the axial direction being fastened on said lug (35).

11. A hydrokinetic torque coupling device according to claim 1, wherein the torque output element comprises a central hub (8).

12. A hydrokinetic torque coupling device according to claim 1, wherein it comprises a reactor (5), with the impeller wheel (3) being able to hydrokinetically drive the turbine wheel (4) through the reactor (5).

13. A hydrokinetic torque coupling device according to claim 2, wherein the internal flange (17) and the external flange (19) comprise concentric cylindrical guiding rims (18, 20) adapted to rest on each other so as to form a bearing.

14. A hydrokinetic torque coupling device according to claim 2, wherein the external flange (19) is so mounted as to pivot about the internal flange (17) through a rolling bearing.

15. A hydrokinetic torque coupling device according to claim 2, wherein each internal flange (17) is totally positioned inside, relative to the external flange (19), with each external flange (19) being totally positioned inside, relative to the internal flange (17).

16. A hydrokinetic torque coupling device according to claim 3, wherein each internal flange (17) is totally positioned inside, relative to the external flange (19), with each external flange (19) being totally positioned inside, relative to the internal flange (17).

17. A hydrokinetic torque coupling device according to claim 4, wherein each internal flange (17) is totally positioned inside, relative to the external flange (19), with each external flange (19) being totally positioned inside, relative to the internal flange (17).

* * * * *